(12) United States Patent
Krishna Dhulipala et al.

(10) Patent No.: US 11,252,241 B2
(45) Date of Patent: Feb. 15, 2022

(54) SYSTEM AND METHOD FOR PROVISIONING PROTOCOL AGNOSTIC INTERFACE TO INTERNET OF THINGS APPLICATION FRAMEWORKS

(71) Applicants: Rama Vamshi Krishna Dhulipala, Clarksburg, MD (US); Koushik Kashojjula, Germantown, MD (US); Timothy Clark Winter, Frederick, MD (US)

(72) Inventors: Rama Vamshi Krishna Dhulipala, Clarksburg, MD (US); Koushik Kashojjula, Germantown, MD (US); Timothy Clark Winter, Frederick, MD (US)

( * ) Notice: Subject to any disclaimer, the term of this patent is extended or adjusted under 35 U.S.C. 154(b) by 0 days.

(21) Appl. No.: 17/067,114

(22) Filed: Oct. 9, 2020

(65) Prior Publication Data

US 2021/0112125 A1    Apr. 15, 2021

Related U.S. Application Data

(60) Provisional application No. 62/912,796, filed on Oct. 9, 2019.

(51) Int. Cl.
*H04L 29/08* (2006.01)
*G16Y 10/75* (2020.01)
*H04L 12/24* (2006.01)

(52) U.S. Cl.
CPC ............ *H04L 67/141* (2013.01); *G16Y 10/75* (2020.01); *H04L 41/0806* (2013.01); *H04L 67/16* (2013.01); *H04L 67/32* (2013.01)

(58) Field of Classification Search
CPC .......... H04W 72/042; H04W 72/0446; H04W 24/08; H04W 24/10; H04W 72/14; H04W 72/1268; H04W 72/046; H04L 5/0048; H04L 5/0023; H04L 5/0051; H04L 5/0091; H04L 5/0053; H04L 5/0055; H04B 7/0626
See application file for complete search history.

(56) References Cited

U.S. PATENT DOCUMENTS

| | | | |
|---|---|---|---|
| 8,914,514 B1* | 12/2014 | Jenkins | H04L 67/10 709/226 |
| 2005/0286516 A1* | 12/2005 | Sundaresan | H04L 67/14 370/389 |
| 2008/0133241 A1* | 6/2008 | Baker | G10L 19/0018 704/260 |
| 2013/0007241 A1* | 1/2013 | Trahan | H04W 4/18 709/223 |
| 2014/0118489 A1* | 5/2014 | Suresh | H04N 19/184 348/43 |

(Continued)

*Primary Examiner* — Michael A Keller
*Assistant Examiner* — Thao D Duong
(74) *Attorney, Agent, or Firm* — Attentive Law Group, PLLC; Paul Ratcliffe (57) ABSTRACT

The present invention provides a system and method for enabling a plurality of IoT applications running on a gateway to utilize a sub-set of underlying protocol services in a common way, where each application is agnostic of the specific implementation of each protocol service and has the flexibility to use any of the underlying protocols in the service set without impacting or restricting the application or any other applications that are sharing the protocol service set.

16 Claims, 3 Drawing Sheets

(56) References Cited

U.S. PATENT DOCUMENTS

| | | | | |
|---|---|---|---|---|
| 2015/0237118 A1* | 8/2015 | Palm | ................... | H04L 41/0266 |
| | | | | 709/204 |
| 2018/0248953 A1* | 8/2018 | Shaw | ...................... | H04W 4/38 |
| 2019/0349426 A1* | 11/2019 | Smith | ................... | H04W 84/22 |

* cited by examiner

SYSTEM AND METHOD FOR PROVISIONING PROTOCOL AGNOSTIC INTERFACE TO INTERNET OF THINGS APPLICATION FRAMEWORKS

RELATED APPLICATION

This application claims priority to U.S. Provisional Patent Application 62/912,796 filed on Oct. 9, 2019, entitled "System and Method for Provisioning Protocol Agnostic Interface to Internet of Things Application Frameworks", the entirety of which is incorporated herein.

GOVERNMENT LICENSE RIGHTS

This invention was made with government support under DE-SC0015806 awarded by the Department of Energy. The government has certain rights in the invention.

BACKGROUND OF THE INVENTION

The Internet of Things (IoT) is a natural extension of the Internet and promises to leverage connectivity on a large scale to new kinds of devices, that have not traditionally been able to participate in Internet Protocol (IP) networks, in order to deliver new capabilities, extract new value, and support new use cases as yet to be conceived. The Industrial Internet of Things (IIoT) is the application of this paradigm to industrial networks, and is characterized by instrumenting existing industrial monitoring and control networks with new orders of magnitude of connected devices, bringing new monitoring and control capabilities into the industrial enterprise to revolutionize business processes and yield new efficiencies.

Legacy industrial devices and communication systems present unique technical problems when enrolling them into IIoT networks, modern IT enterprise networks, and administrative control systems. Further complicating the technical problem for industrial applications is the use of several different legacy protocols and different types of legacy devices which are employed in the industrial space. Thus, there is a need to handle multiple legacy communication protocols and devices, while also allowing for convergence to modern IP-based IIoT architectures. These legacy protocols may differ in operation from the physical layer through the application layer; the particulars of the protocols supported, and the capabilities offered may be quite different from device to device and system to system.

Traditional Supervisory Control and Data Acquisition (SCADA) and industrial enterprise software application hosting has relied on polled protocols since the 1970's, well before the use of modern IP networking. These traditional network data centers monitor and control most industrial assets today (e.g. Electric Grid, Oil and Gas Wells, Water and Waste Water, and others). The controllers and protocols most often used in legacy infrastructure are designed for low speed, multi-drop, serial-based communication channels.

The advent of the Industrial Internet of Things (IIoT) is changing how we accumulate and analyze data. New methods based on IP networking are creating the ability to increase a field worker's productivity and improve asset efficiency by leveraging data across the enterprise, enabling enhanced analytics and producing actionable knowledge. Although there have been great advances in hardware costs, software capabilities, and cloud platforms, there continues to be a tremendous barrier to fully embracing and using modern IP-based networking technologies, as well as the protocol stacks that rely on an underlying IP-based network, to span from the enterprise to the industrial edge. Modern techniques are often eschewed in favor of maintaining backward compatibility with equipment that uses traditional protocol architectures originally designed for non-IP based serial networks. Even those legacy protocols which do support IP based communications often lack some capabilities to fully participate in a modern IP-based infrastructure, for example legacy infrastructures with respect to security or handling of communication links that may exhibit variable latency or asymmetric properties.

In order to transition legacy infrastructures into modern IoT technology efficient methods to collect and process sensor and machine data at remote sites over local communication links, to extract and transform the application data models utilized by the protocols that operate on those local communication links, and to broker protocols into a form suitable for use both with legacy and modern paradigms are needed. Processing the data in proximity to edge devices rather than sending all data to a distant centralized cloud servers improves overall system performance, minimizes latency, increases the sampling rate and the amount of data that is feasible to extract from the system, enables faster response times, and significantly reduces overall bandwidth requirements and the cost of managing widely distributed networks.

There are many industrial and IoT protocols that may be selected in the construction of an Industrial IoT system. To some extent the related standardization and market acceptance of various options are still evolving, and there is not likely to be convergence to 'one' Industrial or IoT protocol anytime in the near future, if ever. Further there will always be a necessity to support some legacy/proprietary protocols, as well as an ever-increasing suite of IoT-like protocols driven and evolved by particular vendors, vertical markets, and standardization bodies.

Traditional networking system approaches are all characterized by the use of purpose-designed protocols and methods, often explicitly designed and implemented in consideration of the capabilities and interfaces of the Internet Protocol (IP), and the nature of the use cases require little consideration of legacy devices or interoperation with other protocols that may not fully map into IP based architectures, and, by extension, the enterprise IT scheme.

As an example, a modern system that utilizes HTTPS Web Services and describes data payloads in a standardized format such as JSON will most often work over any IP-based network. But a legacy protocol, perhaps deriving from dial-up-networks or fixed-wireless networks, will not 'speak' JSON, may not even have an ability to converge to any network layer within the bounds of the protocol specification, and might typically embed an application layer protocol directly over-top of a point-to-point serial link. Often converging these two kinds of systems is not simply a matter of wrapping the legacy protocol in a convergence layer, but must also take into consideration timeouts, latencies, and the impact on the protocol behaviors that may be explicitly or implicitly expected by the legacy device. Brokering such a legacy protocol into a modern system is most efficiently accomplished at the edge of the network, near the 'edge device'. It is usually necessary to 'terminate' the legacy protocol stack at the network edge, to accommodate behaviors of the communications links that are presumed by the legacy protocol's design, such as latencies and timeouts. Indeed, fully terminating a protocol stack before brokering it into another protocol stack is best performed when the intermediate data between the two protocol stacks is 'at 'rest', i.e. all protocol operations that delivered the data have been completed and the data within the data set is unbound from the underlying protocol. This enables architectures where an application is able to remain agnostic of underlying protocol stacks, as well as removing a class of integration complexity where two different protocols that are operating on 'live' data may have unintended interactions between each other by coupling through the data set.

Therefore, what is needed is a system to handle or transition multiple legacy infrastructures, devices, and communication protocols into modern IoT technology, efficient methods to collect and process sensor and machine data at remote sites over local communication links, to extract and transform the application data models utilized by the protocols that operate on those local communication links, and to broker protocols into a form suitable for use with both legacy systems and modern solutions.

SUMMARY OF THE INVENTION

The present invention overcomes these technical problems by providing a technical solution, as further detailed herein, as a system and method for enabling a plurality of IoT applications running on a gateway to utilize a sub-set of underlying protocol services in a common way, where each application is agnostic of the specific implementation of each protocol service, where each application interacts in an abstract way to a sub-set of underlying protocol services via the construction and maintenance of a data set bound to a service set, and each application has the flexibility to access and use any of the underlying protocols bound to the data set via the service set without impacting or restricting the application or any other applications that are sharing the protocol service set. Applications utilize the data set directly, and protocol operations are transparently carried out via the underlying protocol service set and bound to update the data set as needed.

The present invention relates to the field of computing, and more specifically to the use of a gateway to broker data between industrial devices that use standardized or proprietary industrial protocols and legacy or cloud based IIoT infrastructure, as well as the use of a gateway to host protocol-agnostic applications that can perform further operations on data bound to such protocols. The present invention makes it possible to write an application in a way that is largely agnostic to which specific underlying protocols is used, and further to change underlying protocols with minimum to no impact on the overall application business logic. This is enabled through the construction and use of a data set and a protocol service set between the application and the underlying protocol services. As a result, it is possible to engage in rapid application development and reuse of application business logic and procedures across multiple underlying protocols and supported devices, leading to further efficiencies in the IIoT technology adoption process.

An exemplary embodiment of the present invention provides a system that is able to support applications which are able to coordinate the collection of data from and give commands to/from sensors and industrial controllers using combinations of heterogeneous protocols, yet the applications need no special knowledge of the detailed operation of the underlying protocols. After collecting data represented within these protocol services the system then performs data extraction and translation to map the heterogeneous set of protocol data (edge data) into an internal uniform semantic model known to and expected by the application, in the form of a protocol agnostic data set, independently of the protocol service that interacts with the device to/from data is sent/received. The construction of the protocol agnostic data set in conjunction with the configuration of a supporting protocol service multiplexor allows for the data in the protocol agnostic data set to be bound abstractly to one or more underlying protocol services. The transparent invocation of the underlying protocol services in support of the protocol agnostic data set is based on configuration and context. Based on the operation of the underlying protocol services the data set can be transparently updated as needed to reflect the state of the data elements that have been conveyed within a specific protocol.

The edge data representation in the data set is such that the data is 'at rest' between the application and the supporting protocol services, allowing the application to easily operate upon that edge data independently of the underlying protocol service. With this basis the application can perform a number of operations upon the data, including brokering the data between two different protocol stacks, applying customized logic to know when to report that data or an aggregation or derivation from that data via a different protocol, analyzing the data to produce meaningful metrics, reports, and alarms to a cloud infrastructure using protocols such as MQTT, CoAP, HTTPS, JSON, and XML. Further the present invention can locally store the edge data, for example in a time-series data record, such that further processing or reporting may be deferred until such a time as it is needed. Other types of processing of the data not explicitly described here may be performed as well. The application at the edge thus can greatly augment the capabilities of a legacy edge device independently of and complementary to a cloud, and indeed can do so while still supporting the capability for legacy head end systems to interrogate and interact with the edge device as they do today.

Further, the present invention enables a set of applications running on an IIoT gateway to share access to common set of protocol services thereby simplifying the architectural complexity for multiple sandboxed applications to independently access the same edge device using the same edge protocol stack. In a similar way, a single application can access multiple edge devices over multiple protocol stacks, such that edge data from multiple sources can be processed and dispatched within a single sandboxed application in support of some unified purpose. This supports the partitioning of application logic in conformance with implementation approaches consistent with modern security architectures.

Additionally, the present invention provides a remote processing device, such as an Edge IoT gateway device, the device comprising: a device processor and device machine readable instructions on a tangibly embodied device memory; the device having a communication portion for receiving and transmitting; the device processor performing processing, based on the device machine readable instructions including: (a) load at least one protocol configuration; (b) for each of the at least one protocol configuration, the device instantiates a session multiplexor on the device; (c) connect, via the communication portion, to a local protocol service; (d) register local resources on the device to establish an association between an element maintained in a local data set and abstract operations that may be performed on the element by the session multiplexor; (e) discover remote resources in communication with the device; (f) establish local session primitives between the local resources and the remote resources; (g) register, by the multiplexor, the remote resources onto the device to establish an association between an element maintained in a local data set representative of a remote resource; (h) receive, by the remote device, a request to perform an operation on a data element utilizing the session primitives; (j) determine whether the session multiplexor should use one of the local data sets or the protocol service to fulfil the request; and (k) process the request using the determined local data set or the selected protocol service.

The present invention also provides a remote processing device the device comprising: a device processor and device machine readable instructions on a tangibly embodied device memory; a communication portion for receiving and transmitting; a processor performing processing, based on the device machine readable instructions including: the instructions including a plurality of applications; the device having at least one data set; the device having at least one session multiplexor; the device having at least one protocol service; wherein at least one of the plurality of applications maintaining association with a plurality of data elements in the at least one data set; wherein the at least one session multiplexor maintains an association between the plurality of data elements in the least one data set and the at least one protocol service; wherein an application operation on the at least one data set indirectly causes a session multiplexor to carry out an associated operation on the at least one data set via the at least one protocol service; and wherein the at least one protocol service causes at least one session multiplexor to carry out an operation on at least one data element with the data set, which may indirectly cause an operation to be carried out within an application via that dataset.

BRIEF DESCRIPTION OF THE DRAWINGS

The following detailed description of the invention is better understood when read with reference to the drawings in which.

DETAILED DESCRIPTION

Hereinafter, aspects of the methods and associated systems in accordance with various embodiments of the invention will be described. As used herein, any term in the singular may be interpreted to be in the plural, and alternatively, any term in the plural may be interpreted to be in the singular. It is appreciated that features of one embodiment as described herein may be used in conjunction with other embodiments. The present invention can be more fully understood by reading the following detailed description together with the accompanying drawings (FIGS. 1-3), in which like reference indicators are used to designate like elements.

Figure 1:
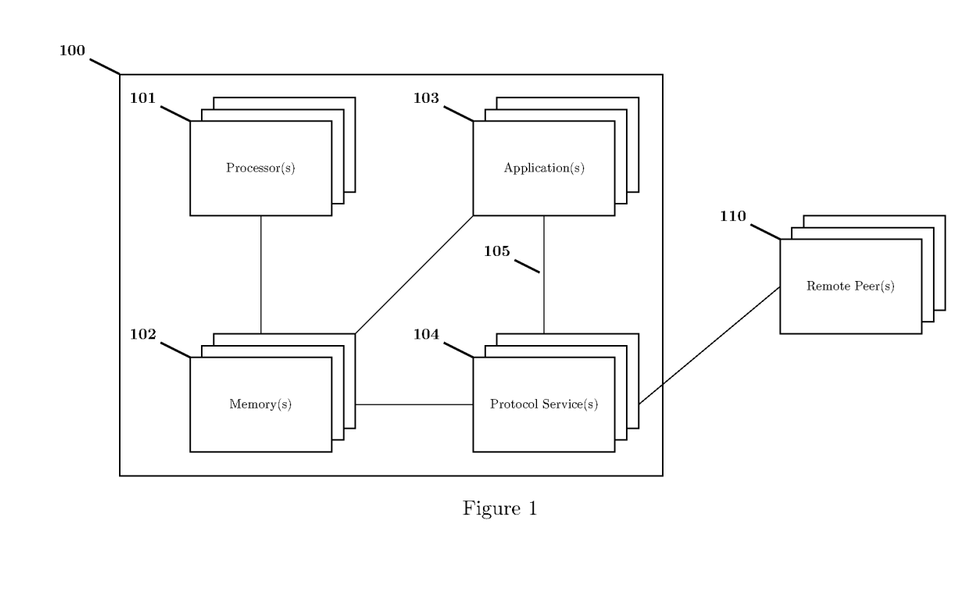
FIG. 1 depicts a high-level system implementation of an exemplary embodiment of the present invention.

FIG. 1 depicts a high-level overview of a system that implements a typical embodiment of the invention. The tangibly embodied computer 100, for example an IoT edge gateway, consists of components including but not limited to one or more processing elements 101, one or more memory elements 102, one or more applications 103, and one or more protocol services 104. An IoT edge gateway is a device remote from peer devices such as servers, enterprise structure, and field devices (i.e. controllers, monitoring equipment, and the like). Oftentimes, the IoT edge gateway is co-located with the field devices. Memories 102 may be comprised of one or more disparate memory technologies including RAM, ROM, Flash drives, files, databases, or other volatile and non-volatile memory devices. In general access to the processing elements by the applications 103 and the protocol services 104 are mediated through the memories 102 as per the typical embodiments of computers known in the art. The applications 103 are in particular implementing business logic for IoT use case independent of the underlying protocols that bear data elements to and from the application. The protocol services 104 are in particular implementing device-facing and/or cloud-facing protocols in support of the IoT application including industrial protocols, internet protocols, standardized protocols, and proprietary protocols. The remote peers 110 are representative of peer applications that are communicating with and interacting with applications 103 via the protocol services 104. The applications 103 are not explicitly aware of the details and procedures required to operates the underlying protocol services 104. The present invention provides a system and method by which the applications 103 are able to employ the protocol services 104 by specifying mechanisms of operation 105 between the applications 103 and the protocol services 104.

Figure 2:
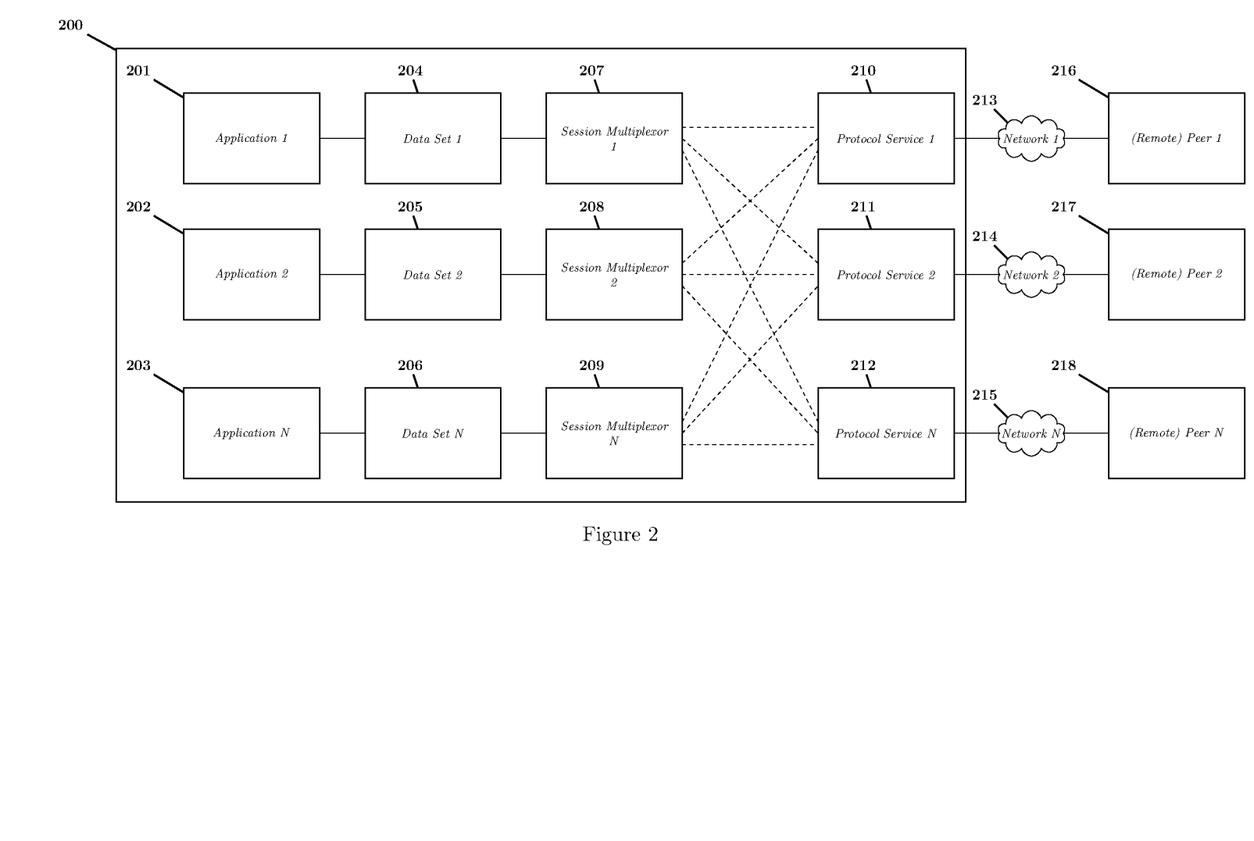
FIG. 2 depicts a system diagram of exemplary embodiment of the present invention.

FIG. 2 depicts a system that implements a typical embodiment of the invention. The tangibly embodied computer 200 hosts application processes 201, 202, and 203, which are interacting logically and independently with remote peer devices 216, 217, 218. Remote peer devices 216, 217, 218 are peer entities to the tangibly embodied computer 200 that are in communication with the application processes 201, 202, 203. Exemplary embodiments of remote peer devices 216, 217, 218 include field devices such as substation monitoring equipment, pump-off controllers, metering equipment, building controllers, or similar devices. Other embodiments of remote peer devices 216, 217, 218 may include hosted applications such as a traditional Supervisory Control and Data Acquisition (SCADA) head-end, an analytic database, or a 'cloud' application such as may be deployed, for example, in Amazon AWS or Microsoft Azure.

Communication pathways between application processes 201, 202, 203 and remote peer devices 216, 217, 218 are supported via underlying network connectivity 213, 214, 215. Here the underlying network connectivity encompasses not only the traditional view of Internet Protocol capable connectivity over e.g. cellular, WiFi, Ethernet, but also legacy and specialized communications links which may be implemented, for example, over point-to-point serial communications links.

Communication to and from remote peer devices 216, 217, 218 occurs using specific protocols which are particular to each peer and they may not be utilizing the same protocol. In general, a communication protocol defines how data and commands are encoded in messages sent to and from the Peer device 216, 217, 218, and what procedures are implemented to provide the services and properties offered by the specification of each protocol. Different communication endpoints may support different communication protocols, and the capabilities and presentation of data within each of those protocols will be different. Abstract operations between the applications 201, 202, 203 are provided via the data sets 204, 205, 206 and the protocol services 210, 211, 212. The data sets 204, 205, 206 support access on behalf of the application 201, 202, 203 in a form that is decoupled from the underlying protocols and is in a primitive form suitable for direct processing by applications 201, 202, 203

(i.e. in a form that is most easily utilized in the programming language used to implement 201, 202, 203). By instantiation and configuration, data within the data sets 204, 205, 206 are bound to and mapped to operations within protocol services 210, 211, and 212 via the session multiplexors 207, 208, and 209. Elements within the data sets 204, 205, 206 may be independently bound to one or more protocol services 210, 211, 212. Protocol services 210, 211, 212 then implement: (1) the specific logical instructions that implement protocol-specific computations; (2) data encoding and decoding flows; and (3) protocol state machines necessary to communicate with the peer devices 216, 217, 218.

Another aspect related to the data sets 204, 205, 206 is they can be implemented as a file and the file is transformed through the provisioning process. In one embodiment the data sets 204, 205, 206 are implemented as a file, the content of which changes or is transformed to represent: (1) the interaction by the application with the data set; and (2) the interaction by the underlying protocol upon the data set. This transformation leads to a modified, unique, and novel file particular to that implementation. In another embodiment, the data sets 204, 205, 206 are implemented by an in-memory file such as a data structure where the in-memory file is changed or transformed to a modified, unique and novel file.

By way of example, protocol service 210 implements a service to access a specific protocol understood by the remote peer device 216 via network 213. Similarly, protocol service 211 and network 214 provide a protocol implementation and communications connectivity to remote peer device 217. Protocol service 212 and network 215 provide the same in support of peer device 218. The protocol services 210, 211, 212 provide a complete implementation of a protocol up to and including a session-oriented application layer interface. On the network-facing side the protocol service implementation extends to the physical communication interface. In the open system interconnection ("OSI") model, the protocol service 210, 211, 212 will handle layers 2 through 6. The OSI model divides network communication into seven layers. In the OSI model, control is passed from one layer to the next, starting at the application layer (Layer 7) in one station, and proceeding to the bottom layer, over the channel to the next station and back up the hierarchy. The OSI model takes the task of inter-networking and divides that up into what is referred to as a 'stack' that consists of the following 7 layers: layer 1—physical, layer 2—data link, layer 3—network, layer 4—transport, layer 5—session, layer 6—presentation, and layer 7—application. Real-world protocols may not always map directly or completely to the OSI model, but nonetheless the OSI model has proven to be a useful abstraction to anchor discussions of protocol design and behavior and is well known within the art. Layer 7 data, the 'data at rest' is maintained in the data set 204, 205, 206. The application 201, 202, 203 may initiate a protocol operation, for example to read a one or more data items maintained on a remote peer 216, 217, 218, by invoking a protocol-agnostic 'read' primitive on one or more data items maintained in the data set 204, 205, 206. The data set 204, 205, 206 is instrumented to transparently invoke the configured session multiplexor 207, 208, 209 based on context and configuration, the session multiplexor dispatches to and causes the protocol operation to be carried out via protocol services 210, 211, 212, which in turn invoke the remote peer 216, 217, 218 to carry out the necessary operations as defined by the protocol to obtain the requested data element or elements. The protocol 210, 211, 212 then conveys the response back to the session multiplexor 207, 208, 209 which in turn applies the updates to the data elements contained within the data set 204, 205, 206. In one embodiment, the application 201, 202, 203 may be informed of the updated data element by invoking an event-based callback. In another embodiment, the application 201, 202, 203 may have been blocked on the data element and may be released to continue execution once the data element has been updated. In all cases the application 201, 202, 203 has remained agnostic of the underlying protocol operations and is instead operating within the abstraction that: (1) a request was made to obtain a data element within a data set 204, 205, 206; and (2) the updated data element in the data set 204, 205, 206 is now available for further processing.

The session-oriented application interface, layer 5, will construct and maintain logical communication channels that leverage the underlying protocol stack on behalf of the application 201, 202, 203 as required in support of the data set 204, 205, 206. The session-oriented interface will implement primitives such as 'connect'/'disconnect' as suited to the underlying protocol and will maintain that logical connection as necessary and multiplex access across a plurality of applications 201, 202, 203 to the underlying protocol. The session-oriented interface will extract and present data primitives contained within each protocol from the format utilized by the protocol, applying presentation layer (layer 6) transformations as needed, to the primitive format suited for native use by the application 201, 202, 203, and cause the data set 204, 205, 206 to be updated so that the application 201, 202, 203 may access and utilize the data primitive. This primitive format may include, for example, integer, boolean, byte, and floating-point encodings as supported by the programming language that implements the application 201, 202, 203, or compound objects constructed from such primitives.

The data set (204, 205, 206) may implement conversion routines between the primitive format and the format required by a session multiplexer (207,208,209). For example, in one case the conversion may occur between a single-bit understood by a protocol service (210, 211, 212), and conveyed to the data set (204,205,206) by the session multiplexer (207,208,209), and a boolean primitive as implemented by the microprocessor and understood by an application (201, 202, 203). Other examples may include conversions between an integer data type and a string, or between a different encoding of an integer data type to another encoding of a different integer data type that represents the same quantity. The conversion process and maintenance of the primitive data types utilized by an application occurs through the data set's implementation and maintenance of a file to hold the primitive data type and the conversion information necessary to broker that data type to and from the session multiplexer.

The data set interface supports generic access methods on behalf of the application 201, 202, 203, for example 'read' and 'write', in order to allow the application 201, 202, 203 to interact transparently with the underlying protocol in a way that allows manipulation of the application data conveyed within the protocol while still remaining decoupled from the detailed implementation and encodings used by the underlying protocol. A key point is that the content of application data conveyed via the protocol is capable of being understood by the application 201, 202, 203 without the application 201, 202, 203 requiring any direct knowledge of underlying protocol primitives. As a consequence, to a reasonable extent, the application logic and structure is invariant of any particular instantiation of an underlying protocol or its communication channels. Indeed, to the extent that a different remote peer 216, 217, 218 offers the same kind of data element (e.g. 'pressure') via a different underlying protocol, the same application 201, 202, 203 can utilize the same operations on the data set 204, 205, 206 to interact with that data element from the different remote peer 216, 217, 218 via the different underlying protocol. The data set 204, 205, 206, accesses the correct protocol service 210, 211, 212 to carry out the operation via the session multiplexor 207, 208, 209 by configuration and context.

At the application layer, the underlying protocol details are abstracted away in favor of operation on a protocol-independent data set 204, 205, 206. There is often a convergence layer that provides transport, session, and presentation layer abstractions to the application user. In some cases, the system still sees proprietary protocols and encodings filling this role. There are also a number of standardization efforts that have enjoyed various degrees of industry acceptance thus far, including: (1) CoAP; (2) MQTT; (3) DDS; (4) HTTP-based; and others. Further, application layer encodings over these protocols may be proprietary, binary, JSON, WL, or other encodings. The use of the data set 204, 205, 206 interposed between the application 201, 202, 203 and the protocol service 210, 211, 212 allows even these encoding details to be abstracted in design and operation.

The selection of the underlying session layer protocol provider is largely of no consequence to a particular application function. Yet due to the nature of the industry, many OEMs and application providers tend to be rigid in their support of the underlying approach, in part because the underlying session layer protocol has direct impact on the mechanisms used to implement the application layer communication. This need not be required in practice, and it has a limiting effect both on the flexibility of the applications 201, 202, 203 and the ability of the application 201, 202, 203 to evolve to support a different scheme.

The proposed method of use of the present invention allows an application layer: (1) to remain agnostic of the underlying communication protocol; (2) to provide a service to the application in support of a particular underlying protocol session; (3) for that service to implement the required protocol services and procedures independently of an application; and (4) to allow an application logic the flexibility to change the underlying protocol service without impacting the overall application.

Practically, most protocols can be abstracted as providing session layer services, where protocol support is given to operation (e.g. read/write) on specific service application points (e.g. resources). In the most general sense, the IoT protocol provides service multiplexing/demultiplexing functionality in support of an application layer to operate on specific services and conveys in some form opaque application layer protocol data units (PDUs) in support of end-to-end communications.

With the abstraction, it is possible to map a protocol into a common application layer API, via access to data elements via a data set 204, 205, 206, similar to what has been done at the network layer with socket interfaces. Furthermore, an application 201, 202, 203 may utilize one or more device-facing protocol stacks in conjunction with one or more cloud-facing IoT protocol stacks to impose a unified functionality across the disparate protocol sets; and other applications 201, 202, 203 may independently co-exist with and leverage common resources within the protocol stack implementations.

Practically this means that it is possible to write an application 201, 202, 203 in a way that is largely agnostic to which specific underlying protocols are used, and further to change underlying protocols with minimum to no impact on the overall application 201, 202, 203, and indeed to possibly enumerate and support multiple underlying protocols for the same application 201, 202, 203 in a converged and transparent way. This enables rapid application development and reuse of application business logic and procedures across multiple underlying protocols and supported devices.

Figure 3:
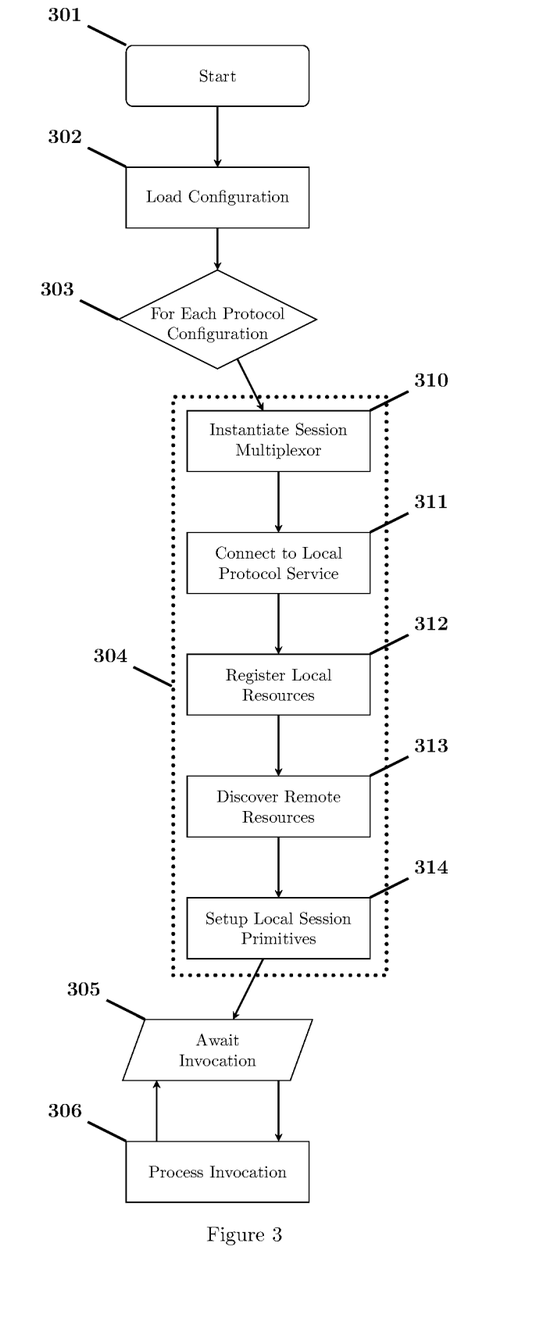
FIG. 3 depicts procedural flow related to the initialization and operation of an application within a system that implements a typical embodiment of the invention.

Depicted in FIG. 3 is a procedural flow related to the initialization and operation of an application within a system that implements an exemplary embodiment of the present invention.

The initialization or Start 301 is an entry point to the method for an application to initialize and operate over a protocol service.

In the load configuration step 302 the system loads the application and protocol specific configuration information from a configuration storage mechanism. In one embodiment, this configuration is specific to and local to the application. However, arrangements may have been made for the configuration to have been updated and manipulated independently of the application. The configuration contains configuration elements which are specific to instantiating the underlying data set and protocol service in support of the application. For example, the elements may include an IP layer configuration on how to reach a particular peer device, security credentials required to establish security context for said interaction, and protocol specific configurations such as supported features, timeouts, etc. Further it may contain elements to inform and bind the data set construction, such as the identification of a data element (e.g. 'pressure') and the requisite means to interact with that data element via the underlying protocol (e.g. register number or object encoding and access method).

For each protocol specified within the configuration set (step 303), the system scans through the obtained configuration elements, which may specify operations over multiple protocols, and iterates them through an invocation analysis process "TAP" 304 on a per-protocol basis. The TAP 304 includes instantiation of a session multiplexer step 310 done in support of a specific protocol configuration; a connection to a local protocol service step 311, which performs the local connection between the session multiplexer and the common protocol implementation shared by multiple applications. The IAP also includes a register local resources step 312, which informs the protocol service what resources are supported by the application and what resources may be of interest by the application with respect to a peer device operating over said protocol, which informs the construction and maintenance of a data set. Resources in register local resources step 312 specifically map to particular data elements within a data set that are made available via the protocol, e.g. discrete primitives or compound objects as described above. The IAP includes a discover remote resources step 313, when supported by the underlying protocol, which optionally interacts with the peer device 213, 214, 215 via said protocol and discovers which application resources are available via the protocol. Not all protocols may be capable of supporting such a service. Finally, the IAP includes a set up local sessions primitive step 314, which finalizes the configuration and instantiation with respect to the local application, making the primitives available to the application via the session multiplexer 204, 205, 206 available for operation.

Once the IAP 304 is complete, the procedural process flow continues with step 305 where the system awaits invocation in an idle state in a typical embodiment. The idle state includes a data set 204, 205, 206 and a session multiplexer 207, 208, 209 in service of an application 201, 202, 203 awaiting a local or remote invocation on a resource bound to the protocol. Such invocation may occur, for example, when an application timer expires triggering polling of the state of a remote resource. In other example, as per the capabilities of a specific protocol, an application may be capable to receive an asynchronous resource invocation from a peer device 216, 217, 218 based on interaction with the data set 204, 205, 206 via the protocol 210, 211, 212 and session multiplexer 207, 208, 209. Process invocation step 306 processes the specific resource invocation in the context of the application.

One area where the present invention provides both a technical improvement and efficiency gain is to the processing of the data in proximity to edge devices rather than sending all data to distant centralized cloud servers for processing. This improves overall system performance, minimizes latency, increases the sampling rate and the amount of data that is feasible to extract from the system, enables faster response times, and significantly reduces overall bandwidth requirements and the cost of managing widely distributed networks. The present invention provides multiple protocol stacks which can be integrated and entangled within these legacy networks.

The present invention makes use of one or more stacks or communication protocols integrated or forced upon these legacy systems lacking the necessary protocol. A stack is an abstraction which comprises different layers that do different jobs or functions. In a typical internet you might have an Ethernet layer, an IP layer, and a TCP layer. In Bluetooth, for example, there is a radio layer and a layer for the radio to talk to a microprocessor and a security layer that handles security and a layer that handles multiplexing of different channels. These protocols are architected in layers in this manner and then each layer is typically governed by a state machine within a single layer. A state machine will identify who has the connection and if the connection has been secured (or not). If the connection has not been secured, then the system is configured to disallow or block access.

The present invention is especially useful for differing types of devices and communication protocols since this system integrates multiple protocol stacks or layers which are designed to interact with varying communication protocols.

One aspect of the present invention that is used for interacting with legacy devices is the use of an IOT gateway. The IOT gateway is a device which may interact with a multitude of devices relevant for the application. For example, the IOT gateway may include a Bluetooth radio, an IEEE 802.15.4 radio, as well as other radios for communicating with the communication protocols of the legacy devices deployed in the remote location. Further, some devices or sensors can be retrofitted with radios or wireless modems using Bluetooth or 802.15.4 radio signals to allow communication with the IOT gateway. Such retrofitted devices are often called capillary devices. Oftentimes, these retrofitted modems are used in industrial settings to replace wire because it's often easier and cheaper to connect through a wireless device.

Considering the age, longevity, and cost to replace of these industrial systems, it is often preferable to keep using the legacy technologies since they are already integrated with industrial application. However, the enterprise and administrators would prefer to employ modern authorization protocols and deploy a system which bridges communications between modern devices and networks and legacy devices and networks. The system of the present invention provides the ability to administer older legacy systems.

One example of a traditional system (prior to the present invention being deployed) is to remotely monitor a rod-pump controller in an Oil and Gas application. Many such systems operate between a back-end data acquisition system located in the enterprise and a rod-pump controller device co-located in the field with the pumping equipment. Most typically the rod-pump controller is communicating over a point-to-point serial link utilizing an industry-specific protocol such as Modbus. Some legacy systems use a layer-two solution such as a dial-up modem or a fixed-wireless radio system to extend the serial link back to the enterprise, where the traditional enterprise head-end directly engages in protocol operation at layer 2 in order to interrogate the rod-pump controller. Other approaches may tunnel the serial link over an IP-based protocol, which allows the serial protocol to more-or-less transit IP based networks, but the traditional head-end still engages in polling behavior to interrogate the rod-pump controller. In these embodiments there is little or no 'intelligence' at the edge communications device beyond what is necessary to stand up and route access to a serial link. These approaches incur extra overhead of end-to-end polling and any convergence to other protocols must happen at the head-end, most typically with middleware stacks. Some further approaches in the industry do employ more intelligence at the edge, some of which can intelligently and locally poll the rod-pump controller at the edge and convert that local polling behavior to periodic report, e.g. from 'pull' to 'push'. Such approaches do reduce some of the end-to-end overhead, and can sometimes convey the protocol data back to the head end in a different form than Modbus, but still are to a large extent 'purpose built' and thus less nimble, e.g. the protocols in use may be fixed and the application that drives them is monolithically integrated to perform only that function.

By employing the present invention, the legacy system is open to new approaches and use cases. Since application logic can be developed and deployed independently of the protocol stacks in use, domain experts are able to quickly develop, tune, and customize applications with specific behaviors suited to their specific use cases. The communication gateway at the edge that implements the application logic which can be fine-tuned in such a way that its localized logic is complementary to the head end logic, performing localized analytics, etc., which are capable to reduce overall system overhead and enable more advanced use cases that leverage edge intelligence. The domain experts do not need intimate knowledge of how to operate the underlying protocol stacks. Legacy polling methods can simultaneously be supported and deployed alongside methods that integrate the rod-pump controller data and operation to new cloud-based paradigms. Thus, a seamless and graceful migration path is supported and an outdated 'rip and replace' is not required. Similarly, new applications and processing at the edge can be added in an incremental and measured way, without requiring a monolithic application to be re-integrated and re-built. The present invention allows the segmentation and partitioning of application logic enabling multiple legacy infrastructures, devices, and communication protocols to interact efficiently with modern IoT technology.

The systems and methods of the invention in described embodiments may be implemented as a system, method, apparatus or article of manufacture using programming and/or engineering techniques related to software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may be further implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In an embodiment of the invention, the systems and methods use networks, wherein, the term, 'networks' means a system allowing interaction between two or more electronic devices, and includes any form of inter/intra enterprise environment such as the world wide web, Local Area Network (LAN), Wide Area Network (WAN), Storage Area Network (SAN) or any form of Intranet.

In an embodiment of the invention, the systems and methods can be practiced using any electronic device. An electronic device for the purpose of this invention is selected from any device capable of processing or representing data to a user and providing access to a network or any system similar to the internet, wherein the electronic device may be selected from but not limited to, personal computers, mobile phones, laptops, palmtops, tablets, portable media players and personal digital assistants.

As noted above, the processing machine used to implement the invention may be a suitable computer or other processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system (OS). Thus, embodiments of the invention may include a processing machine running the Unix operating system, the Apple iOS operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system (such as macOS™), the Apache operating system, an OpenStep™ operating system, the Android™ operating system (and variations distributed by Samsung, HTC, Huawei, LG, Motorola, Google, Blackberry, among others), the Windows 10™ operating system, the Windows Phone operating system, the Windows 8™ operating system, Microsoft Windows™ Vista™ operating system, the Microsoft Windows™ XP™ operating system, the Microsoft Windows™ NT™ operating system, the Windows™ 2000 operating system, or another operating system or platform.

The systems and methods of the invention may utilize non-operating systems (aka serverless architecture) as well for distributed processing. In the processing of the invention, services on cloud computing networks leveraging systems like AWS (as offered by Amazon Web Services, Inc.), BlueMix (as offered by IBM), and Microsoft Azure, can perform data collection services using varying technologies that are spun up on demand using tools like Chef to create container based deployments like Docker, or non-container compute services (e.g. AWS Lambda).

The invention may use or provide real-time analytics processing that may use scale on demand to the users in the system, in accordance with at least one embodiment of the invention. Such offerings as AWS lambda and Kinesis (as offered by Amazon Web Services, Inc.) are among those that may be used in implementation of the invention. For example, AWS Lambda may be utilized to execute code (to perform processes of the invention) in response to various triggers including data changes, shifts in system state, or particular action taken by users. Similarly, in an embodiment, the OS (operating system) of the invention might be encapsulated in an EC2 instance (as offered by Amazon Web Services, Inc.) or multiple instances for deployment.

Another example of a traditional system is a device in the electrical distribution system that may speak a proprietary protocol or an older standardized protocol such as DNP3. In order to converge such a device to the modern grid it may be necessary to marshal its 'native' protocol into a new protocol such as IEC 61850. Further, is often desired to do so in such a way that allows security policy to be specified and enforced independently of the application behavior, and it is also often necessary to participate more fully in field-area networks that may require localized edge processing and interaction over other protocols with other devices at the edge such that a portion of the distribution system may reasonably take some action independently of coordination through a centralized head-end. The present invention allows such systems to be realized, by for example but not limited to 1) allowing domain experts to quickly and efficiently specify application layer behavior independently of deep protocol expertise, 2) allowing multiple protocols to be bound to that application via an abstract data set, which allows different protocols to transparently interact with elements in that data set as necessary, 3) allowing a natural partitioning of application logic independently of the underlying protocols, 4) allowing an architecture where protocol service behavior can be constrained by security policies (e.g. firewalling) independently of how an application layer will operate over that protocol.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner, such as over a network or over multiple networks. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the invention to communicate with any other entity; i.e., so as to obtain further instructions or to access and use remote memory stores, for example. Such communication portion, component, system, or technologies used to provide such communication might include a network, the Internet, Intranet, Extranet, LAN, an Ethernet, wireless transceiver, a radio, or any client server system that provides communication, for example. Such communications technologies may use any suitable protocol such as TCP/IP, UDP, or OSI, for example.

Further, multiple applications may be utilized to perform the various processing of the invention. Such multiple applications may be on the same network or adjacent networks, and split between non-cloud hardware, including local (on-premises) computing systems, and cloud computing resources, for example. Further, the systems and methods of the invention may use IPC (interprocess communication) style communication for module level communication. Various known IPC mechanisms may be utilized in the processing of the invention including, for example, shared memory (in which processes are provided access to the same memory block in conjunction with creating a buffer, which is shared, for the processes to communicate with each other), data records accessible by multiple processes at one time, and message passing (that allows applications to communicate using message queues), for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, C#, Objective C, COBOL, dBase, Forth, Fortran, Java, Modula-2, Node.JS, Pascal, Prolog, Python, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

The invention claimed is:

1. A remote processing device the device comprising:
a device processor and device machine readable instructions on a non-transitory computer readable memory;
the device having a communication portion for receiving and transmitting;
the device processor performing processing, based on the device machine readable instructions including:
load at least one protocol configuration;
for each of the at least one protocol configuration, the device instantiate a session multiplexor on the device;
connect, via the communication portion, to a local protocol service;
register local resources on the device to establish an association between an element maintained in a local data set and abstract operations that may be performed on the element by the session multiplexor;
discover remote resources in communication with the device;
establish local session primitives between the local resources and the remote resources;
register, by the multiplexor, the remote resources onto the device to establish an association between an element maintained in a local data set representative of a remote resource;
receive, by the device, a request to perform an operation on a data element utilizing the session primitives;
determine whether the session multiplexor should use one of the local data sets or the protocol service to fulfil the request; and
process the request using the determined local data set or the selected protocol service.

2. The remote processing device of claim 1, wherein the device brokers data between a first protocol configuration of the at least one protocol configuration and a second protocol configuration of the at least one protocol configuration.

3. The remote processing device of claim 1, wherein the device aggregates data between a first protocol configuration of the at least one protocol configuration and a second protocol configuration of the at least one protocol configuration.

4. The remote processing device of claim 1, wherein the device generates a derivation of data received from a first protocol configuration.

5. The remote processing device of claim 4, wherein the derivation of data is generated from analyzing the data received from the first protocol configuration.

6. The remote processing device of claim 1, wherein the device transmits data received from at least one of the local resources to a first remote resource using a first protocol configuration and to a second remote resource using a second protocol configuration.

7. The remote processing device of claim 6, wherein the first protocol configuration is associated with a legacy protocol and the second protocol configuration is associated with a modern protocol.

8. The remote processing device of claim 1, wherein at least one of the local resources is a sensor.

9. A remote processing device the device comprising:
a device processor and device machine readable instructions on a non-transitory computer readable memory;
a communication portion for receiving and transmitting;
a processor performing processing, based on the device machine readable instructions including:
the instructions including a plurality of applications;
the device having at least one data set;
the device having at least one session multiplexor;
the device having at least one protocol service;
wherein at least one of the plurality of applications identifies and registers at least one local resource, associated with the device, to establish an association between at least one data element associated with the at least one local resource in the at least one data set;
wherein at least one of the plurality of applications allows the device to discover at least one remote resource in communication with the device, wherein the at least one remote resource is associated with a specific protocol service from the at least one protocol service;
wherein the at least one session multiplexor registers the specific protocol service on the device to establish an association between the specific protocol service of the at least one remote resource with the at least one data element associated with the at least one local resource;
wherein the device determines whether the at least one session multiplexor should use the specific protocol service or the at least one data element associated with the at least one local resource set to carry out an associated operation; and wherein the device causes the at least one session multiplexor to carry out the associated operation using the specific protocol service or the at least one data element.

10. The remote processing device of claim 9, wherein the device brokers data between a first protocol service of the at least one protocol service and a second protocol service of the at least one protocol service.

11. The remote processing device of claim 9, wherein the device aggregates data from a first protocol service of the at least one protocol service and a second protocol service of the at least one protocol service.

12. The remote processing device of claim 9, wherein the device generates a derivation of data received from a first protocol service.

13. The remote processing device of claim 12, wherein the derivation of data is generated from analyzing the data received from the first protocol service.

14. The remote processing device of claim 9, wherein the device transmits data received from at least one local resource to a first remote resource using a first protocol service and to a second remote resource using a second protocol service.

15. The remote processing device of claim 14, wherein the first protocol service is associated with a legacy protocol and the second protocol service is associated with a modern protocol.

16. The remote processing device of claim 9, wherein the at least one local resource is a sensor.

\* \* \* \* \*